United States Patent [19]

Javaherian

[11] Patent Number: 4,867,123
[45] Date of Patent: Sep. 19, 1989

[54] ADAPTIVE SPARK TIMING CONTROLLER FOR AN INTERNAL COMBUSTION ENGINE

[75] Inventor: Hossein Javaherian, Troy, Mich.

[73] Assignee: General Motors Corporation, Detroit, Mich.

[21] Appl. No.: 201,658

[22] Filed: Jun. 2, 1988

[51] Int. Cl.⁴ .............................................. F02P 5/14
[52] U.S. Cl. ..................................... 123/425; 123/435
[58] Field of Search ................................. 123/425, 435

[56] References Cited

U.S. PATENT DOCUMENTS

| | | | |
|---|---|---|---|
| 4,449,501 | 5/1984 | Greeves | 123/425 |
| 4,481,925 | 11/1984 | Karau et al. | 123/425 |
| 4,556,030 | 12/1985 | Aono | 123/425 |
| 4,622,939 | 11/1986 | Matekunas | 123/425 |
| 4,679,536 | 7/1987 | Morita | 123/425 |
| 4,715,341 | 12/1987 | Douaud et al. | 123/425 |
| 4,727,842 | 3/1988 | Takahashi | 123/425 |

Primary Examiner—Willis R. Wolfe
Attorney, Agent, or Firm—Howard N. Conkey

[57] ABSTRACT

An adaptive ignition controller for an internal combustion engine provides for engine operation at substantially peak thermal efficiency for all engine operating conditions by controlling the ignition advance angle initiating combustion to a crankshaft angle before top dead center that establishes the burn center at a predetermined crankshaft angle, the burn center being determined by monitoring the value of an indicator function $PV\nu$ during the combustion period.

5 Claims, 2 Drawing Sheets

ADAPTIVE SPARK TIMING CONTROLLER FOR AN INTERNAL COMBUSTION ENGINE

BACKGROUND OF THE INVENTION

This invention relates to spark timing control in an internal combustion engine, and particularly to a system for adaptively controlling engine spark timing to achieve substantially peak thermal efficiency.

Typical spark timing control systems for internal combustion engines sense a set of spark timing dependent variables, such as engine coolant temperature, engine speed and engine load, and adjust the ignition timing to a prescribed calibration for a baseline engine. Generally in these systems, the spark timing angle is retrieved from stored tables addressed by the spark timing dependent variables with additional retard, in some cases, in response to knock, manifold absolute pressure or a throttle movement detector. A problem with this approach is that, because of manufacturing differences and aging, the engine being controlled is not necessarily the same as the baseline engine used for reference.

One approach to the solution of this problem requires extensive effort in the design of the engine to ensure both that all combustion chambers behave the same and that components will not significantly alter characteristics with aging. Even with such design and type quality control in the manufacturing process, the required uniformity and stability over time of such engines cannot always be achieved.

Closed loop control of spark timing has been suggested in the prior art in various forms. Location of peak pressure spark timing control systems have been proposed in which spark timing is controlled to maintain a predetermined location of peak combustion pressure. This timing of peak combustion pressure has been found to produce MBT operation for many engine operating conditions. The location of peak pressure may be sensed using head bolts with an embedded piezoelectric material which responds to the stress created in reaction to the pressure on the engine cylinder head. However, this approach has difficulties when the combustion charge is highly dilute or the engine is under light load.

Some systems have been suggested which adjust ignition timing to control the maximum absolute combustion pressure with respect to some predetermined reference level. There is, in addition, a suggestion in the U.S. Pat. No. Greeves 4,449,501 issued May 22, 1984, that ignition timing may be controlled to maintain the ratio of maximum combustion chamber pressure to maximum motored pressure in accordance with a stored table addressed by engine speed and load factors. These approaches, however, involve stored references determined for a baseline engine which may not be the desired reference for the particular engine at any given time.

Another known system provides for the closed loop control of ignition timing by controlling the middle of the combustion event to a predetermined angle after top dead center. However, in this system, certain assumptions were made in determining the middle of the combustion event or burn center. These assumptions include (1) the duration of combustion is 120 degrees and (2) the mass burn rate is assumed to increase linearly with crankshaft rotational angle up to the 50% mass burned point and then to decrease linearly to the end of combustion. However, it has been observed that the duration of combustion may vary substantially from 120 degrees. For example, the duration may vary between 40 and 150 degrees. Further, it has been observed that the burn rate varies non-linearly. Accordingly, an error in the determination of the 50% mass burned point may result.

SUMMARY OF THE INVENTION

The primary object of this invention is to provide for adaptive control of the spark timing of an internal combustion engine for achieving substantially the minimum advance for best torque (MBT) resulting in substantially peak thermal efficiency. The subject invention is directed to the last described form of closed loop control of ignition timing wherein ignition timing is controlled for MBT so as to locate the burn center (the 50% mass burned point) at a predetermined optimum angular location such as 10 degrees after cylinder top dead center (ATDC). However, the subject invention provides for an improved determination of the 50% mass burned point that is valid for varying burn durations and does not rely on an assumption of a linearly varying burn rate.

In accord with this invention, an indicator function based on cylinder pressure and volume is monitored as a function of crankshaft angle from the point of mixture ignition and until it represents the end of combustion. The crankshaft angle at which the indicator function is ½ the difference between the indicator function at the start of combustion and the indicator function at the end of combustion represents the angle of the 50% mass burned point. The start of combustion is adjusted to control the determined 50% mass burned point to a desired crankshaft angle for MBT.

Further details and advantages will be apparent from the accompanying drawings and the following description of a preferred embodiment.

Figure 1:
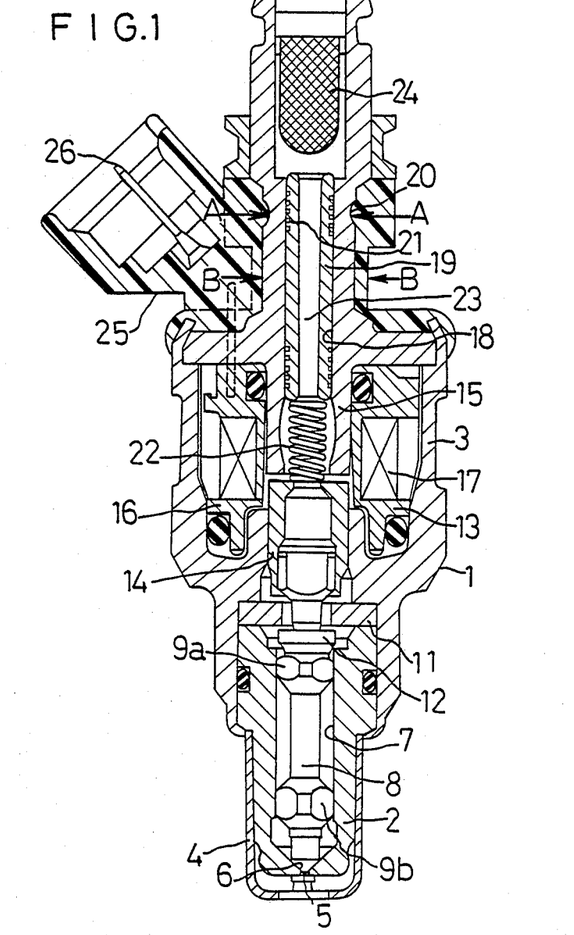
FIG. 1 is a schematic diagram of the mass fraction burned in the combustion chamber of a cylinder between the start of combustion angle and the end of combustion angle.

Referring to FIG. 1, there is illustrated a diagram of the mass fraction burned in the combustion chamber of an engine beginning with the start of combustion angle $\theta_i$ and the end of combustion angle $\theta_f$. As hereinafter used, $\theta_i$ is the magnitude of the crank angle from a reference angle to be described and $\theta_f$ is the magnitude of the crank angle from the reference angle at which the end of combustion occurs. As previously indicated, the peak thermal efficiency of the engine can be approximately achieved by controlling the angle $\theta_m$ corresponding to the 50% mass fraction burned point to a predetermined value, such as 10 degrees after top dead center.

Figure 2:
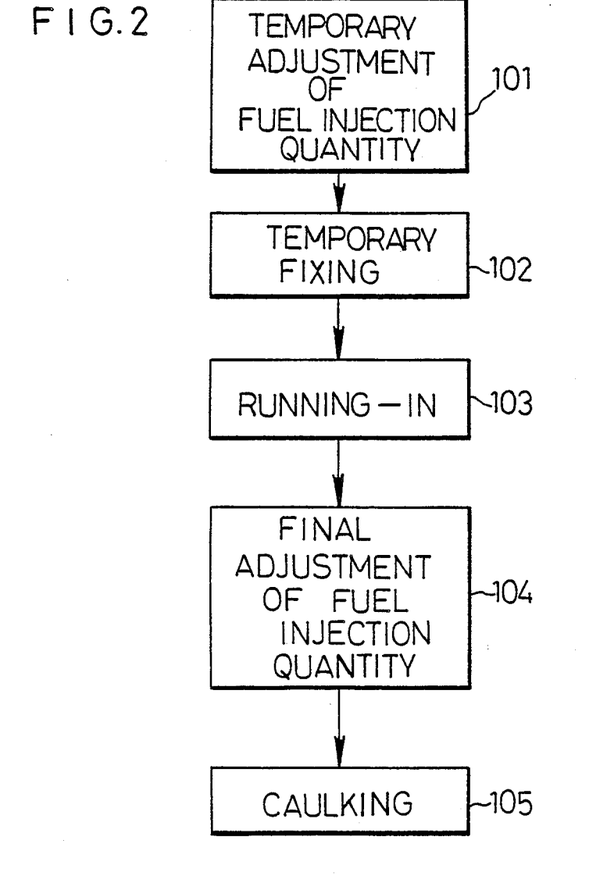
FIG. 2 is a schematic diagram of an engine with a control according to this invention.

Referring to FIG. 2, there is depicted a system for controlling the combustion process in the cylinders of an internal combustion engine so that the burn center angle $\theta_m$ is controlled to a predetermined angle. An internal combustion engine 10 is depicted which, in this embodiment, is a spark ignited engine having four combustion chambers or cylinders 11, an intake manifold 12 and a rotating crankshaft, not shown, through which power is transferred from the cylinders 11 to the vehicle drive train. Each cylinder 11 is provided with an intake valve 17 communicating with the intake manifold 12, an exhaust valve 18 communicating with the exhaust manifold 15, a spark plug 20 and a combustion chamber pressure sensor 22. Fuel drawn into the cylinders 11 through the intake valves 17 is provided by fuel injectors, not illustrated. Also, a number of other parameter sensors may be employed for controlling various engine operating functions including fuel injection quantities. These parameters may include, for example, engine temperature and mass air flow into the engine.

While a particular engine configuration has been illustrated, the invention is applicable to other configurations including engines having a fewer number of cylinders and a different number of valves and spark plugs for each cylinder.

The spark plugs 20 are controlled by an ignition circuit 23 in response to timing values provided by a digital computer 25. The digital computer 25 is standard in form and includes a central processing unit (CPU) which executes an operating program permanently stored in a read only memory (ROM) which also stores tables and constants utilized in controlling the timing angle of the ignition of the fuel via the spark plugs 20. Contained in the CPU are conventional counters, registers, accumulators, flag flip flops, etc., along with a clock which provides a high frequency clock signal.

The digital computer 25 also includes a random access memory (RAM) into which data may be temporarily stored and from which data may be read at various address locations determined in accord with the programs stored in the ROM. A power control unit (PCU) receives vehicle battery voltage and provides regulated power to the various operating circuits.

The computer further includes an input/output circuit (I/O) comprised of an output section that provides the required spark advance value to the ignition circuit 23 for establishing the timing angle for the spark plugs 20 in accord with this invention. In addition, other signals that may be required by the ignition circuit 23 are provided by the digital computer 25 and may include, for example, the clock signal provided by the clock in the CPU. The I/O also includes an input section for receiving engine rotation and position signals as will be described. These signals are utilized by the computer 25 in determining the actual burn center angle $\theta_m$ depicted in FIG. 1. In addition, the signals may be utilized by the digital computer 25 in establishing engine speed as required for engine control.

An analog-to-digital unit (ADU) provides for the measurement of the pressure signals P1, P2, P3 and P4 corresponding to the respective outputs of the four pressure sensors 22 monitoring the pressure in the cylinders of the engine 10. These pressure signals are sampled and converted under control of the CPU and the program stored in the ROM as will be described.

The ignition circuit 23 responds to the spark advance angle command by the digital computer 25 and provides a high voltage pulse to activate a spark plug 20 and to direct the pulse to the proper plug. These pulses are illustrated as the signals S1, S2, S3 and S4 in FIG. 2. The ignition circuit 25 may include a standard distributor for directing the pulse to the proper plug and may take any appropriate form from the prior art. For example, the ignition circuit 23 may take the form of the engine control unit and distributor illustrated in the U.S. Pat. No. 4,231,091 Motz issued Oct. 28, 1980 which responds to commands from a digital computer for providing high voltage pulses to spark plugs of an internal combustion engine.

Combustion chamber pressure sensors 22 may be any known type of pressure sensor adapted or adaptable to sensing the pressure inside the combustion chambers 11. One such sensor is a piezoelectric deflection type of transducer which includes a finger projecting through the cylinder water jacket to sense pressure caused deflections of the combustion chamber wall. Another sensor that may be utilized is a piezoelectric sensor attached directly to the combustion chamber wall. Sensors with membranes of piezoelectric or other materials (such as fiber optics) exposed directly to the combustion chamber interior or combined with the spark plug may also be used. However, in the embodiment to be described, it is not required that the pressure transducer be calibrated, the system responding only to the uncalibrated output of the pressure transducer.

Signals indicative of crankshaft rotational position and signals representing a predetermined angle before the top dead center position of each of the cylinders of the engine 10 are provided by transducers rotated by the output crankshaft of the engine 10. Particularly, signals indicative of crankshaft rotational position are provided to the digital computer 25 and the ignition circuit 23 by a ring gear 27 having teeth spaced around its periphery and which is rotated by the crankshaft. While other intervals may be used, in this embodiment, the teeth are spaced at one degree intervals around the periphery of the ring gear 27. An electromagnetic sensor 28 is positioned to sense the teeth on the ring gear as it is rotated by the engine crankshaft to provide crank position pulses to the ignition circuit 23 and the digital computer 25.

Signals representing a predetermined angle in advance of top dead center position of each of the cylinders of the engine 10 is provided by a disc member 29 also rotated by the crankshaft and which has teeth spaced at 180 degree intervals. An electromagnetic sensor 30 is positioned to sense the teeth on the member 29 for providing a TDC pulse to the ignition circuit 23 and the digital computer 25 at the predetermined angle in advance of each piston top dead center position. The predetermined angle before top dead center at which the TDC pulse is provided is at least as great as the largest spark advance angle of the ignition pulses provided to the spark plugs 20 during engine operation.

The digital computer 25 responds to each TDC pulse output of the sensor 29 to initiate an operating program stored in the ROM for determining the actual burn center angle $\theta_m$ and to provide for the adjustment to the spark advance angle $\theta_i$ so that the burn center angle $\theta_m$ is established at a desired angle after top dead center for MBT.

Figure 3:
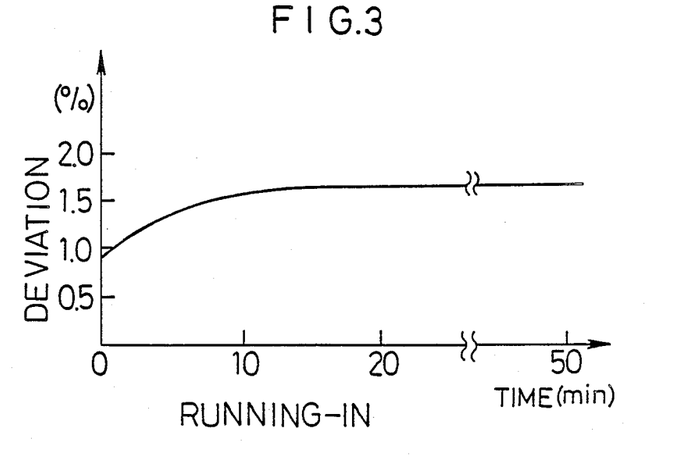
FIG. 3 is a diagram illustrating the operation of the controller of FIG. 2 in carrying out the principles of this invention.

The flow diagram of FIG. 3 illustrates the series of steps in the stored routine that are executed by the digital computer 25 in response to each TDC signal to determine the burn center angle $\theta_m$. The programming of the digital computer 25 to implement the series of steps as set forth in FIG. 3 may be accomplished by any programmer skilled in the art of engine control.

In response to a TDC signal provided by the electromagnetic sensor 30, the computer 25 initiates a TDC interrupt routine that begins at point 38 and then proceeds to execute a series of steps that monitor engine rotation until the engine reaches the angle $\theta_i$ at which combustion starts. In the present embodiment, the start of combustion is assumed to coincide with the spark advance angle determined by the computer 25 and provided to the ignition circuit 23 so that the start of combustion angle $\theta$hd i of FIG. 1 is known. The value of $\theta_i$ determined from the spark advance angle is the angle from the TDC pulse to the angle at which combustion starts.

The series of steps start at point 39 where a $\theta$ count register monitoring engine rotation from the TDC pulse is compared with the start of combustion angle $\theta_i$. If the engine has not rotated to this angle, the program waits at step 40 for the next sensing of a flywheel tooth by the electromagnetic sensor 28. When the next tooth is detected indicating a rotation of the engine over an angle represented by the spacing of the teeth on the ring gear 27, the $\theta$ count register is incremented at step 41. The steps 39 through 41 are continually repeated until the engine has rotated the angle $\theta_i$ after the TDC pulse and is therefore at the angle at which combustion in the cylinder begins.

The computer next proceeds to execute a series of steps that monitor the mass fraction burned in the cylinder until the end of combustion at the crank angle $\theta_f$. In the present embodiment, the mass fraction burned is monitored and the end of combustion angle $\theta_f$ is determined by means of an indicator function $I(\theta)$ defined by:

$$I(\theta) = P(\theta)V^{\nu b}(\theta) \qquad (1)$$

where P is the cylinder pressure measured by the respective transducer 22 of FIG. 2, V is the combustion chamber volume which is a known value at a given crankshaft angle and $\nu_b$ is the mean heat capacity ratio of the combustion products. The end of combustion angle $\theta_f$ is the angle $\theta$ after the TDC pulse at which the indicator function $I(\theta)$ is at a peak. The value of $\nu_b$ for an air/fuel mixture is assumed to be a constant such as 1.25. Alternatively, the end of combustion angle $\theta_f$ may be determined by determining the crankshaft angle $\theta$ at which an equivalent indicator function $J(\theta)$ is zero where $J(\theta)$ is defined by the differential relation:

$$J(\theta) = (1/P)(dP/d\theta) + (\nu hd\ b/V)(dV/d\theta) \qquad (2)$$

The use of the indicator function I(8) is preferred particularly when the effect of noise on the combustion pressure is significant such that it would be desirable to eliminate the requirement for pressure differentiation. As can be seen, the indicator function $I(\theta)$ depends only on the total pressure and does not require any transducer calibration.

The pressure transducer bias is estimated on-line but its gain is not needed. The pressure offset is derived from the fact that the process during the compression stroke between any two close points (e.g. 90±10 degrees BTDC) can be taken to be adiabatic. Let the actual pressure be P, the measured pressure $P_m$, transducer offset $P_{off}$ and the transducer gain K. Then:

$$P = K(P_m + P_{off}) \qquad (3)$$

For the adiabatic process where $PV^\nu$ is constant and for any two points we have:

$$P_1/P_2 = (V_2/V_1)^\nu \qquad (4)$$

or $$K(P_{m1} + P_{off})/K(P_{m2} + P_{off}) = (V_2/V_1)^\nu \qquad (5)$$

From the above relation, the pressure offset is determined as $$P_{off} = \{P_{m2}(V_2/V_1)^\nu - P_{m1}\}/\{1 - (V_2/V_1)^\nu\} \qquad (6)$$

Returning again to FIG. 3, following the step 39 when the engine reaches the start of combustion angle $\theta_i$, the program repeatedly executes a series of steps to repeatedly determine the value of the indicator function I with respect to the crank angle $\theta$ as the crankshaft rotates and stores each value in a RAM table as a function of engine angle $\theta$ after the TDC pulse until a peak of the indicator function is detected. The crankshaft angle $\theta$ after the TDC pulse at which this peak is detected comprises the end of combustion angle $\theta_f$. This routine begins at step 42 where the pressure P in the cylinder corresponding to the TDC pulse last provided by the sensor 29 is sampled and stored.

At step 44, the program determines the value of $V^{\nu b}(\theta)$. In this embodiment, this value is retrieved from a lookup table of values stored in the ROM as a function of the engine angle $\theta$ after the TDC pulse. A value of $V^{\nu b}$ is stored in the table for each angle of crankshaft position beginning at the TDC pulse position in one angular degree intervals. It is readily apparent that the volume V of the cylinder at each angular position can be determined from which the value $V^{\nu b}$ is calculated and then stored in the ROM lookup table. The angle after the TDC pulse to be used in retrieving the value of $V^{\nu b}(\theta)$ is obtained from the $\theta$ count register previously referred to that is incremented upon the sensing of each tooth on the ring gear 27. The count in the register represents the value of the crankshaft angular position after the TDC pulse.

After the value of $V^{\nu b}(\theta)$ is obtained, the program proceeds to a step 46 where the value of the indicator function $I(\theta)$ is calculated and stored in a RAM table as a function of engine angular position in accord with equation (1) based on the pressure sampled at step 42 and the value of $V^{\nu b}$ retrieved at step 44. At step 48, the program determines whether or not the last value of the indicator function calculated and stored at step 46 is greater than the previous indicator function saved at step 46 during the previous execution of the TDC interrupt routine. Assuming step 48 determines an increase in the value of the indicator function, the program proceeds to a step 50 where it waits for the next sensing of a flywheel tooth by the electromagnetic sensor 28.

When the next tooth is detected indicating a rotation of the engine over an angle represented by the spacing of the teeth on the ring gear 27 (one degree in this embodiment), the program proceeds to a step 52 where the $\theta$ count register containing a count representing the angular position of the crankshaft after the position of the TDC pulse is incremented.

From step 52, the program returns to step 42 wherein the steps 42, 44, 46 and 48 are repeated as previously described for the new values of cylinder pressure and cylinder volumes determined at steps 42 and 44 at the new crankshaft angle. As long as the value of the indicator function is increasing, the foregoing steps including steps 50 and 52 are repeated at each incremental angular position determined by the spacing of the teeth on the ringgear 27.

When the step 48 determines that the indicator function last calculated at step 46 is less than the previously determined value, the indicator function has peaked representing end of combustion. At this point, the crankshaft angle stored in the $\theta$ count register incremented at step 52 represents the end of combustion angle $\theta_f$. When this condition is sensed, the program then proceeds to a step 54 where the angle $\theta_f$ is set equal to the angle represented by the count in the $\theta$ count register.

The program next executes a series of steps to determine the crankshaft angle location of the burn center of the combustion process just completed. This 50% mass burned point is the crankshaft angle at which the indicator function I($\theta$) is ½ the difference between the indicator function at the start of combustion (crankshaft angle $\theta_i$) and end of combustion (crankshaft angle $\theta_f$). This series of steps begins at step 56 where the values of the indicator function at the crankshaft angles $\theta_i$ and $\theta_f$ are retrieved from the table of values stored by repeated executions of step 46. Step 58 then determines the value of the indicator function I($\theta_m$) at the burn center, the value of I($\theta_m$) being equal to [I($\theta_f$)−I($\theta_i$)]/2. Then finally at step 60, the program determine from the table of values stored by step 46 the crankshaft angle $\theta_m$ corresponding to the indicator function value determined at step 58. This angle is the burn center angle.

At the next step 62, the spark advance angle, which is equivalent to the start of combustion angle $\theta_i$, is adjusted as a function of the error between the measured burn center angle $\theta_m$ and the desired calibration burn center angle $\theta_d$ for MBT. In one embodiment, $\theta_d$ corresponds to 10 degrees after top dead center of the cylinder. The adjustment of the spark advance angle is made in accord with the expression $$\theta_{inew} = \theta_{iold} + K(\theta_d - \theta_m) \quad (7)$$

where $\theta_{inew}$ is the new spark advance angle, $\theta_{iold}$ is the prior spark advance angle and $\theta_f - \theta_{iold}$ represents the error in the spark advance angle. This expression is in the form of a first order lag equation where K represents the time constant of the expression. This provides for increased stability of the spark advance value at the expense of a slower response time in the elimination of a sensed error in the spark advance angle. In one embodiment, the value of K was set equal to 0.5. However, this gain factor is a calibration value that may be adjusted depending upon system requirements.

In another embodiment, step 62 may implement a stochastic adaptive control strategy that responds to engine cyclic variations and/or transients in real time.

Following the determination of the new spark advance angle $\theta_{inew}$, the program proceeds to a step 64 where the $\theta$ count register previously incremented at step 41 and 52 is reset and the value of the indicator function I($\theta$) is reset to zero so as to initialize the routine for the next cylinder to undergo combustion. Thereafter, the program proceeds to step 66 where it points to the next cylinder so that the execution of the next top dead center interrupt routine is provided in relation to the next cylinder to undergo combustion.

At step 68, the program provides the new spark advance angle to the ignition circuit 23 so as to establish the burn center at the desired value. By the series of steps as illustrated in FIG. 3, the spark advance angle is continually updated in adaptive manner so as to continuously provide substantially MBT operation of the engine for all engine operating conditions The foregoing description of a preferred embodiment of the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for controlling the ignition timing angle in an ignition control system for an internal combustion engine having cylinders and an output crankshaft rotated during operation of the engine, the ignition control system initiating combustion in each cylinder of the engine at the determined ignition timing value, the system comprising, in combination:

means for determining the start of combustion in a cylinder;

means for monitoring the value of an indicator function I that is equal to $PV^{v_b}$ during rotation of the crankshaft after the start of combustion where V is the volume of the cylinder corresponding to the crankshaft angular position and $v_b$ is the mean heat capacity ratio of the combustion products, the value of the indicator function having a peak value at the end of combustion in the cylinder;

means for sensing the peak value of the indicator function;

means for determining the crankshaft angle $\theta_m$ at which the value of the indicator function is one half the sum of the values of the indicator function at the start of combustion and the peak value occurring at the end of combustion, the determined angle $\theta_m$ comprising a cylinder burn center; and means for controlling the ignition timing angle to initiate combustion in the cylinders to establish the angle $\theta_m$ and therefore the cylinder burn establish the angle $\theta_m$ and therefore the cylinder burn center at a predetermined crankshaft angle.

2. The system of claim 1 wherein the ignition timing angle is established at an angle $\theta_{inew}$ in accord with the expression $$\theta_{inew} = \theta_{iold} + K(\theta_d - \theta_m)$$

where $\theta_{iold}$ is the last established value of $\theta_{inew}$, K is a constant and $\theta_d$ is the desired combustion center angle.

3. A system for adaptively controlling the ignition timing angle in an ignition control system for an internal combustion engine having cylinders and an output crankshaft rotated during operation of the engine, the ignition control system initiating combustion in each cylinder of the engine at the determined ignition timing value, the system comprising, in combination:

means for determining the crankshaft angle $\theta_i$ of the start of combustion in a cylinder;

means effective at each of sequential angular positions of the crankshaft beginning at the determined crankshaft angle $\theta_i$ for (A) sensing the pressure P in the cylinder, (B) determining the value of $V^v$ where V is the volume of the cylinder corresponding to the crankshaft angular position and $v_b$ is the mean heat capacity ratio of the combustion products, (C) determining the value of an indicator function I equal to $PV^{v_b}$, the value of the indicator function having a peak value at the end of combustion in the cylinder and (D) storing the value of the indicator function I and the angular position of the crankshaft corresponding thereto;

means for sensing the peak in the determined value of the indicator function $PV^{\nu_b}$;

means for (A) retrieving the stored peak value of the indicator function and the stored value of the indicator function corresponding to the start of combustion crankshaft angle $\theta_i$ and (B) determining an indicator function value $I(\theta_m)$ equal to one half of the sum of the retrieved values;

means for determining from the stored values of the indicator function I and corresponding angular positions of the crankshaft, the angular position $\theta_m$ of the crankshaft corresponding to a stored indicator function value equal to $I(\theta_m)$, and means for controlling the ignition timing angle to initiate combustion in the cylinders to establish the angle $\theta_m$ at a predetermined crankshaft angle $\theta_d$.

4. A method of controlling the ignition timing angle in an ignition control system for an internal combustion engine having cylinders and an output crankshaft rotated during operation of the engine, the ignition control system initiating combustion in each cylinder of the engine at the determined ignition timing value, the method comprising the steps of:

determining the start of combustion in a cylinder;

monitoring the value of an indicator function I that is equal to $PV^{\nu_b}$ during rotation of the crankshaft after the start of combustion where V is the volume of the cylinder corresponding to the crankshaft angular position and $\nu_b$ is the mean heat capacity ratio of the combustion products, the value of the indicator function having a peak value at the end of combustion in the cylinder;

sensing the peak value of the indicator function;

determining the crankshaft angle $\theta_m$ at which the value of the indicator function is one half the sum of the values of the indicator function at the start of combustion and the peak value occurring at the end of combustion, the determined angle $\theta_m$ comprising a cylinder burn center; and controlling the ignition timing angle to initiate combustion in the cylinders to establish the angle $\theta_m$ and therefore the cylinder burn center at a predetermined crankshaft angle.

5. A method of adaptively controlling the ignition timing angle in an ignition control system for an internal combustion engine having cylinders and an output crankshaft rotated during operation of the engine, the ignition control system initiating combustion in each cylinder of the engine at the determined ignition timing value, the method comprising the steps of:

determining the crankshaft angle $\theta_i$ of the start of combustion in a cylinder;

at each of sequential angular positions of the crankshaft beginning at the determined crankshaft angle $\theta_i$ (A) sensing the pressure P in the cylinder, (B) determining the value of $V^{\nu_b}$ where V is the volume of the cylinder corresponding to the crankshaft angular position and $\nu_b$ is the mean heat capacity ratio of the combustion products, (C) determining the value of an indicator function I equal to $PV^{\nu_b}$, the value of the indicator function having a peak value at the end of combustion in the cylinder and (D) storing the value of the indicator function I and the angular position of the crankshaft corresponding thereto;

sensing the peak in the determined value of the indicator function $PV^{\nu_b}$;

retrieving the stored peak value of the indicator function and the stored value of the indicator function corresponding to the start of combustion crankshaft angle $\theta_i$ determining an indicator function value $I(\theta_m)$ equal to one half of the sum of the retrieved values;

determining from the stored values of the indicator function I and corresponding angular positions of the crankshaft, the angular position $\theta_m$ of the crankshaft corresponding to a stored indicator function value equal to $I(\theta_m)$, and controlling the ignition timing angle to initiate combustion in the cylinders to establish the angle $\theta_m$ at a predetermined crankshaft angle $\theta_d$.

* * * * *

UNITED STATES PATENT AND TRADEMARK OFFICE
CERTIFICATE OF CORRECTION

PATENT NO. : 4,867,123

DATED : September 19, 1989

INVENTOR(S) : Hossein Javaherian

It is certified that error appears in the above-identified patent and that said Letters Patent is hereby corrected as shown below:

The title page should be deleted to appear as per attached title page.

The sheets of drawing consisting of figures 1-3 should be deleted to appear as per attached sheets.

Signed and Sealed this

Second Day of October, 1990

Attest:

HARRY F. MANBECK, JR.

*Attesting Officer*  Commissioner of Patents and Trademarks

United States Patent [19]
Javaherian

[11] Patent Number: 4,867,123
[45] Date of Patent: Sep. 19, 1989

[54] ADAPTIVE SPARK TIMING CONTROLLER FOR AN INTERNAL COMBUSTION ENGINE

[75] Inventor: Hossein Javaherian, Troy, Mich.

[73] Assignee: General Motors Corporation, Detroit, Mich.

[21] Appl. No.: 201,658

[22] Filed: Jun. 2, 1988

[51] Int. Cl.$^4$ ............................................. F02P 5/14
[52] U.S. Cl. .................................... 123/425; 123/435
[58] Field of Search ............................ 123/425, 435

[56] References Cited

U.S. PATENT DOCUMENTS

| | | | |
|---|---|---|---|
| 4,449,501 | 5/1984 | Greeves | 123/425 |
| 4,481,925 | 11/1984 | Karau et al. | 123/425 |
| 4,556,030 | 12/1985 | Aono | 123/425 |
| 4,622,939 | 11/1986 | Matekunas | 123/425 |
| 4,679,536 | 7/1987 | Morita | 123/425 |
| 4,715,341 | 12/1987 | Douaud et al. | 123/425 |
| 4,727,842 | 3/1988 | Takahashi | 123/425 |

*Primary Examiner*—Willis R. Wolfe
*Attorney, Agent, or Firm*—Howard N. Conkey

[57] ABSTRACT

An adaptive ignition controller for an internal combustion engine provides for engine operation at substantially peak thermal efficiency for all engine operating conditions by controlling the ignition advance angle initiating combustion to a crankshaft angle before top dead center that establishes the burn center at a predetermined crankshaft angle, the burn center being determined by monitoring the value of an indicator function $PV\nu$ during the combustion period.

5 Claims, 2 Drawing Sheets